Dec. 16, 1952        P. WHITE        2,621,758
LUBRICATING APPARATUS
Filed April 8, 1948        2 SHEETS—SHEET 1

Inventor
Percy White
By his Attorney

Dec. 16, 1952 P. WHITE 2,621,758
LUBRICATING APPARATUS
Filed April 8, 1948 2 SHEETS—SHEET 2

Inventor
Percy White
By his Attorney

Patented Dec. 16, 1952

2,621,758

UNITED STATES PATENT OFFICE 2,621,758

LUBRICATING APPARATUS

Percy White, Leicester, England, assignor to United Shoe Machinery Corporation, Flemington, N. J., a corporation of New Jersey Application April 8, 1948, Serial No. 19,716
In Great Britain October 15, 1947

5 Claims. (Cl. 184—83)

This invention relates to automatic lubrication of machine parts and is particularly concerned with the lubrication of shoe sewing machines in which minute quantities only of lubricant are required, any excess causing flooding and damage to shoes being sewn. As hereinafter described one construction of lubricating apparatus in accordance with the invention is arranged to lubricate parts at eleven different points of a shoe-inseam sewing machine.

To deliver minute quantities of lubricant automatically to operating parts of a machine according to common practice, one of two methods is employed. Either the flow of lubricant to each part is induced by pressure and is metered by a restricted orifice or a volumetric measurement is provided necessitating the use of valves to cut off the flow periodically. With a restricted orifice the slightest accumulation of dirt will block the proper flow.

An example of the use of volumetric measurement is illustrated in United States Letters Patent No. 2,051,250, granted August 18, 1936 on application of H. E. Elliott. In the apparatus of the Elliott patent a reservoir is provided in which is mounted a reciprocating plunger having a hole extending through one side to form a cut-off valve with a corresponding hole in the side of a cylinder within which the plunger reciprocates. When the plunger is retracted the flow of lubricant through the cut-off valve is prevented by a spring-actuated poppet valve arranged to admit lubricant above a predetermined pressure. Such an arrangement is advantageous when only a single part needs lubrication. Where numerous parts require lubrication in a single machine, duplication of the pump, reservoir and valves adds complication and expense to the apparatus and leakage may occur in a poppet valve as a result of obstruction by dirt or weakened spring pressure.

One of the objects of the invention is to provide improved apparatus for effective volumetric measurement of lubricant supplied to a machine in a simplified manner by distributing it in relatively small quantities which are automatically conducted to numerous parts without the use of metering orifices and in which the use of poppet or spring-actuated valves are avoided.

An important feature of the present invention, accordingly, relates to the provision in a machine of the type referred to, having lubricant conduits leading to a plurality of parts of the operating mechanisms, of a lubricant distributor comprising a reservoir, a first shaft having a substantial proportion of its surface area exposed to the lubricant in the reservoir and formed with spaced transverse holes to provide metering pockets in which measured quantities of lubricant are separated from the reservoir and a second shaft provided with pins mounted to enter the holes and arranged to cause the measured quantities of lubricant to be expelled into the individual conduits as the second shaft is turned. Preferably the first shaft is provided with plungers slidingly mounted in said holes and the second shaft is driven by the first shaft and is arranged to expel the measured lubricant by reciprocating the plungers in the holes. As hereinafter illustrated, the pins on the second shaft engage and press the plungers along the holes in the first or plunger shaft every half rotation of the plunger shaft. With such an arrangement expensive machine work and the necessity of highly accurate construction are avoided.

These and other features of the invention consist in the devices, combinations and arrangements of parts hereinafter described and claimed which, together with the advantages to be obtained, thereby will readily be understood from the following description taken in connection with the accompanying drawings, in which:

Figure 1:
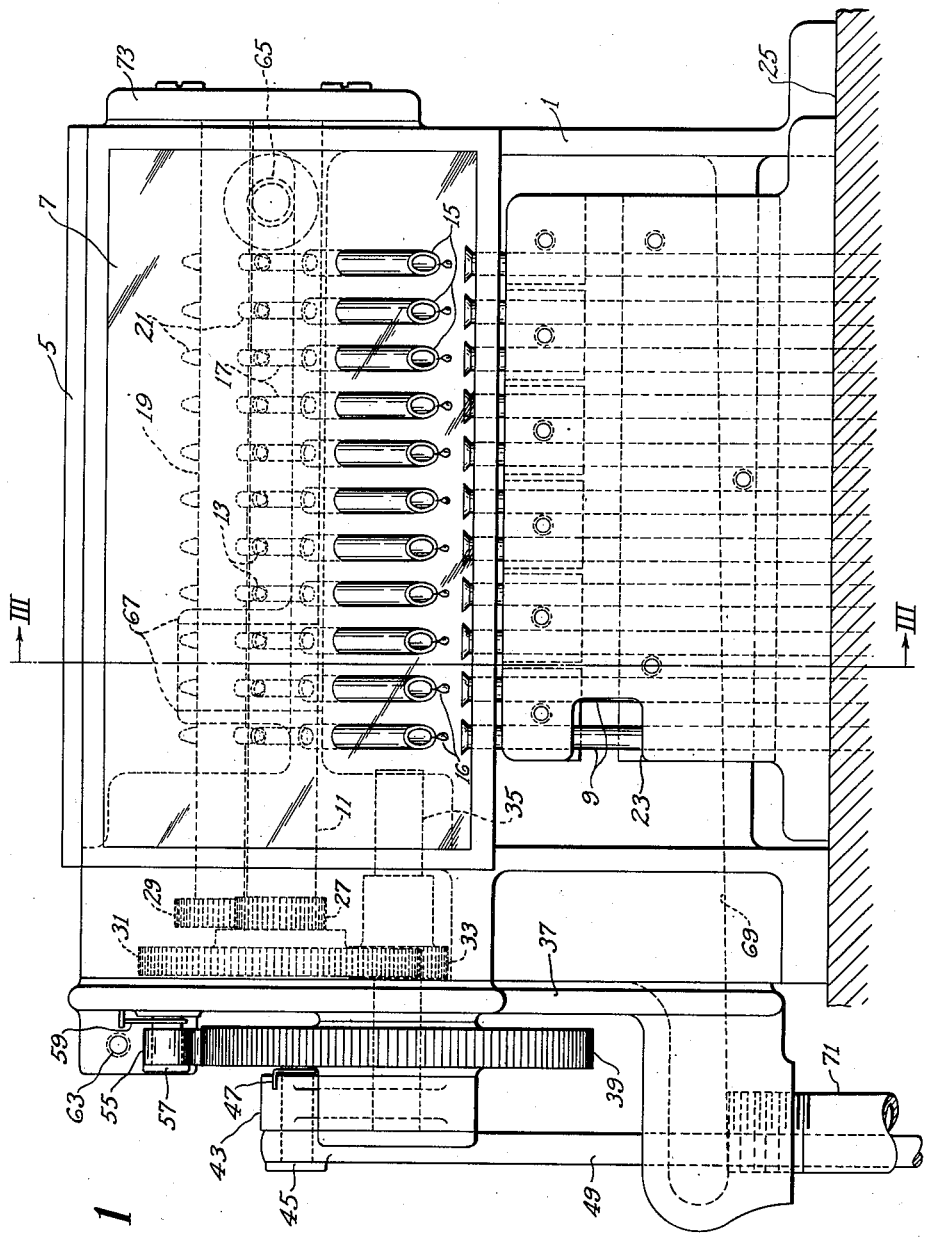
Fig. 1 is a front elevation of a lubricant distributing apparatus embodying the features of the present invention.

The apparatus illustrated in the drawings is applied to the top of an operating head in a shoe inseam sewing machine similar to that disclosed in United States Letters Patent No. 2,041,945, granted May 26, 1936 upon application of Alfred R. Morrill, and is located higher than the parts of the machine to be lubricated, the lubricant flowing by gravity through conduits to the parts. The apparatus is provided with a base in the form of a bracket 1 having at its upper portion an oil chamber or reservoir 3 closed at the top by a glass cover plate 5. The apparatus acts as a lubricant distributor to separate measured quantities of lubricant from the reservoir and to direct them into the individual conduits 9. A sight opening is formed at the front of the base with a glass cover plate 7 through which the upper ends of the conduits are visible and the amounts of lubricant passing from the distributor may readily be observed.

Figure 3:
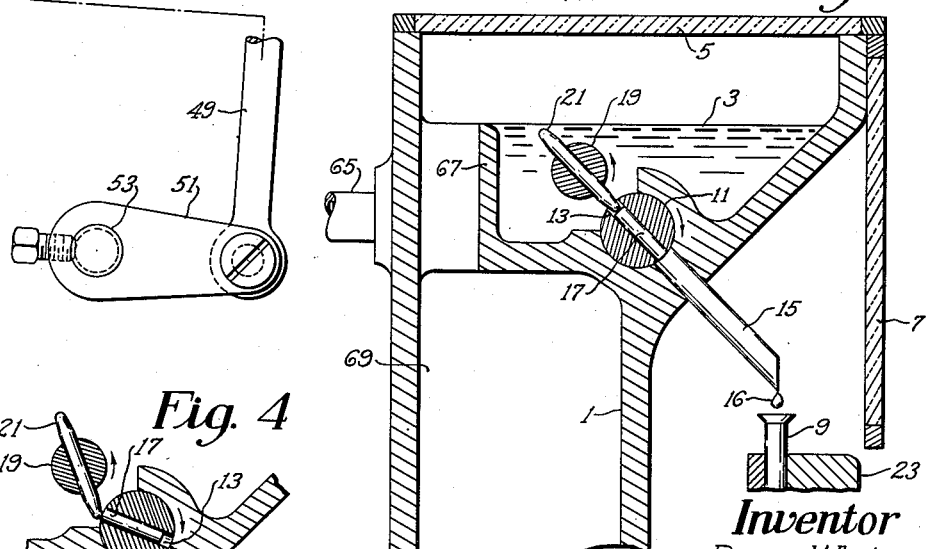
Fig. 3 is a sectional view taken on the line III—III of Fig. 1.

To separate measured quantities of oil from the reservoir and distribute them into the conduits, indicated at 9, the upper ends of which are flared, the bracket 1 is bored to receive a horizontal shaft 11. The material of which the base is formed is cut away within the reservoir 3 to expose an upper quarter of the shaft surface and the shaft is provided with spaced transverse holes 13 forming pockets at opposite sides of the shaft within which the oil is measured. As the shaft is turned in the direction of the arrow in Figs. 3 and 4 of the drawings the pockets at the upper side of the shaft are filled with lubricant and are carried beneath the inner surface of the bore in the bracket which covers the remaining quarter of the shaft surface to cut off further entry of lubricant. When the shaft is turned 180° the lower pockets are brought up to expose them to the lubricant within the reservoir and the lubricant already measured in the upper pockets is expelled into receiving tubes 15, the upper ends of which are secured in the bracket and the lower ends of which are provided with bevel faces to form points. The points assist in breaking up the lubricant passing through the tubes 15 into a series of small drops 16. The points on the tubes are spaced above the upper flared ends of the individual conduits 9 leading to the different machine parts so that a clear view of the lubricant flow is obtainable.

Figure 4:
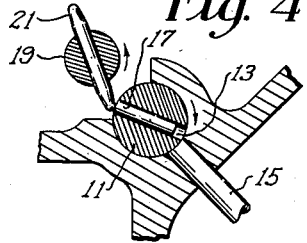
Fig. 4 shows some of the parts shown in Fig. 3 in relative positions just before those shown in Fig. 3 are reached.

To block the direct flow of lubricant from the upper pockets to the lower pockets through the transverse holes in the distributing shaft and to expel the measured lubricant from the lower pockets, each hole 13 has slidingly disposed within it a plunger 17. The plungers 17 are reciprocated within the holes as the holes come into alinement with the lubricant receiving tubes 15. For this purpose the bracket 1 at either end of the reservoir 3 has bearings for a second shaft 19 mounted in parallel relation with and geared to the plunger carrying shaft to rotate simultaneously in a direction opposite to that of the plunger shaft 11 at a one-to-one ratio. The shaft 19 is perforated diametrically to receive a row of parallel projecting pins 21 secured therein. The pins alternately engage opposite ends of the plungers as the shafts are turned, as shown in Fig. 4, and project from the shaft at opposite sides sufficiently to dip within the holes 13 of the plunger shaft during each half rotation. As the pins 21 dip into the holes 13 they force the plungers 17 lengthwise (Fig. 3), expelling the lubricant in the lower pocket portions of the holes and causing other lubricant to be drawn into the upper pocket portions of the holes. The ends of the pins 21 are tapered and rounded to assist their entry into the pockets at the ends of the holes 13 and by providing shorter or longer plungers 17 the sizes of the pockets and the amount of oil in each may be varied according to the needs of the particular part of the machine to be lubricated. Where the length of a plunger is changed the length of the corresponding pin 21 also is changed to insure full stroke of the plunger within its hole.

The conduits 9 are spaced the same distance apart as the holes 13 in the plunger shaft and are secured to the rearward side of a block 23 at the front of the bracket 1. Both the block 23 and the bracket 1 are secured to the frame of the machine, indicated at 25, so that the relationship between the conduits and the distributing apparatus is fixed. To shield the open ends of the lubricant receiving tubes 15 against entry of dirt or foreign material the glass cover plate 7 extends downwardly from the bracket into close proximity with the block 23.

Figure 2:
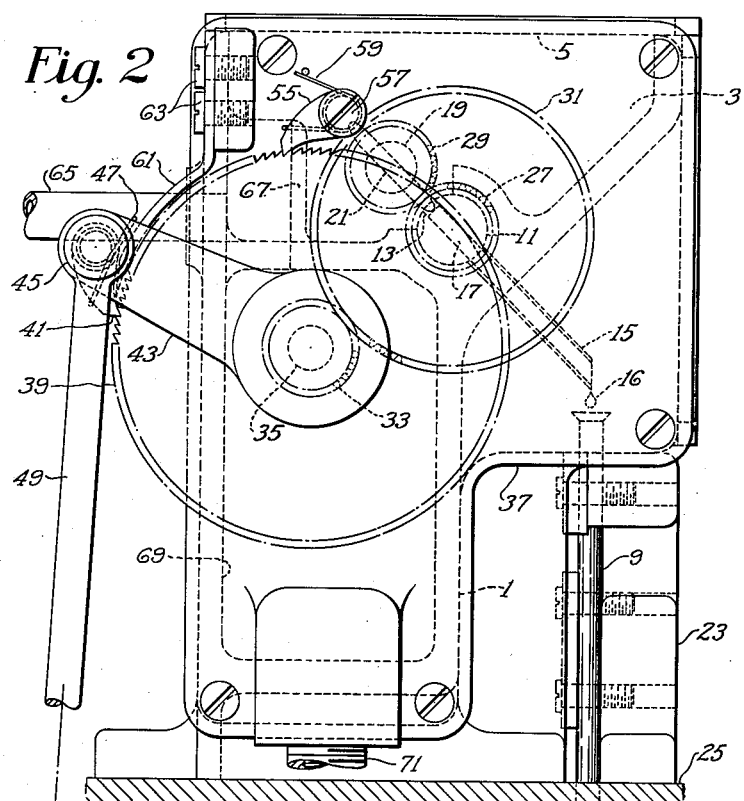
Fig. 2 is a left-hand side elevation of the apparatus of Fig. 1.

The lubricant distributing apparatus is operated at whatever speed is necessary to provide the proper lubrication for the machine on which the apparatus is mounted. In the illustrated form of the machine the plunger shaft 11 has secured to it one end of a pinion 27 which meshes with a pinion 29 on the end of the pin shaft 19. The pinions 27 and 29 are of the same diameter, the pinion 27 being rotated in a clockwise direction when viewed from the left of the apparatus as shown in Fig. 2 so that the pin shaft 19 rotates in a counterclockwise direction.

For driving the plunger and pin shafts the plunger shaft has secured to it a gear 31 which meshes with a pinion 33 secured to a driving shaft 35. The diameter of the gear 31 is three times the diameter of the pinion 33 and the driving shaft is mounted in bearings in the bracket 1 and a plate 37 secured to the bracket. The driving shaft has fast upon it a ratchet wheel 39 formed with approximately 200 teeth engaged by a pawl 41 which is pivotally mounted on the outer end of an arm 43 by a pin 45 secured to the arm. The arm 43 is rotatably mounted on the driving shaft 35 and the pawl 41 is urged toward the ratchet teeth by a spring 47 coiled about the pin 45 with one end engaging the arm and the other the pawl.

For actuating the pawl carrying arm 43 the pin 45 has an outer headed end surrounded by the upper end of a rod 49 connected with the starting and stopping mechanism of the machine. The lower end of the rod 49 is pivotally connected to an arm 51 secured to a clutch shaft 53 corresponding to a shaft, referred to as 220 in Patent No. 2,041,945. The shaft 53 is operatively connected to a treadle for controlling the starting and stopping of the machine. When the treadle is depressed the pawl carrying arm 43 is moved upwardly and the pawl 41 passes idly over the teeth on the ratchet wheel 39. To prevent reverse rotation of the ratchet wheel with the pawl 41 a second pawl 55 is rotatably mounted on a shoulder screw 57 and is actuated by a spring 59 coiled about the screw 57 with one end engaging the pawl and the other end a pin on the frame of the machine. Depressing the treadle causes the machine to be started and when the treadle is released to stop the machine the pawl arm 43 is moved downwardly causing the ratchet wheel and the plunger and pin shafts to be rotated a predetermined amount.

The amount of rotation of the plunger and pin shafts is adjustable in accordance with requirements. For this purpose the actuating pawl 41 at the upper end of its stroke is held out of engagement with the ratchet wheel by a shield 61 secured by screws 63 passing through slots in the shield and into threaded engagement with a lug on the plate 37. Loosening the screws 63 enables the plate to be moved vertically to allow the pawl 41 to engage the ratchet wheel during movement of the pawl a distance equal to the length of one or more ratchet teeth.

With an adjustment of the shield in which the pawl moves the ratchet wheel through the length of one tooth during each treadle movement, a complete rotation of the plunger shaft will take place after 600 operations of the machine in starting and stopping. Since the pins 21 project from each side of the pin shaft 19 and the plungers are moved lengthwise in the plunger shaft every half rotation, a measured quantity of lubricant will be expelled from the pockets at the ends of the holes in the plunger shaft after every 300 releases of the control treadle in the machine. If the shield 61 is adjusted to enable the pawl 41 to move the ratchet wheel the length of two teeth instead of one, lubricant will be expelled from the plunger shaft after 200 releases of the treadle. With an adjustment to cause ratchet wheel to move the length of three teeth, lubrication will be provided after each 100 releases of the treadle.

With the use of the distributing apparatus of the present invention the plunger and pin shafts 11 and 19 are rotated step-by-step through relatively small angular movements to cause lubricant to be expelled from the plunger shaft through the receiving tubes 15 until a drop 16 eventually forms on the lower end of each tube. The drops when enlarged sufficiently fall into the conduits 9 and are directed by gravity to the various parts of the machine. The pointed lower ends of the receiving tubes 15 facilitate the formation of the drops so that they may readily be seen through the shield 7 (see Fig. 1). Thus, during the time in which lubricant is accumulating on a receiving tube until sufficient has been expelled to cause a drop to fall from the pointed end of the tube the drop will serve as a visible indication of the action of the apparatus.

To maintain a supply of lubricant in the reservoir 3 of the apparatus the machine is provided with a sump in its base from which a continuously driven rotary pump supplies the lubricant to the reservoir through a pipe 65. To prevent overfilling a partition 67 spaced inside the rear bracket wall passes surplus lubricant into a chamber 69 and thence into an overflow pipe 71. The overflow pipe conveys the surplus lubricant back to the sump in the base of the machine, the pump being arranged to supply more lubricant to the reservoir than is consumed by the distributing apparatus. To provide a visible check for the height of the lubricant in the reservoir, the right end of the bracket has secured to it a plate 73 within which is formed an inspection window at the normal level of the lubricant.

Although the distributing apparatus acts to expel simultaneously a plurality of measured quantities of lubricant automatically in timed relation to the number of starts and stops of the machine, the actual application of lubricant to the parts from the receiving tubes to conduits 9 occurs at intervals other than those in which the lubricant is expelled from the pockets in the plunger shaft. The expulsion of lubricant being ordinarily in less quantity than is required to cause the drops 16 to fall from the lower ends of the receiving tubes into the conduits and the quantities measured being different for each receiving tube, the times at which the drops fall are different and may be varied independently by simple rearrangement of the plungers in the plunger shaft. When an operating part of the machine requires more lubricant, it is necessary only to remove a plunger 17 and substitute one of shorter length, the corresponding pins 21 being changed to provide full strokes in the plungers where required.

The nature and scope of the invention having been indicated and a particular embodiment having been described, what is claimed is:

1. A lubricant distributing apparatus for a machine having conduits extending to a plurality of the operating parts of the machine and a lubricant reservoir, in combination with a shaft having transverse holes exposed to the lubricant in the reservoir, plungers in the holes of the shaft for expelling lubricant into the conduits and means for reciprocating the plungers in the shaft comprising a second shaft rotating simultaneously with the plunger carrying shaft and pins projecting from the second shaft to engage the plungers in the plunger shaft as the plunger shaft is turned.

2. A lubricant distributing apparatus for a machine having conduits extending to a plurality of operating parts of the machine and a lubricant reservoir, a shaft exposed to the lubricant in the reservoir and formed with spaced transverse holes to provide metering pockets in which measured quantities of lubricant are separated from the reservoir, in combination with means including a second shaft and pins in the second shaft mounted to dip into the holes in the first shaft as the first shaft is turned and arranged to cause the measured quantities of lubricant to be expelled from the pockets into the conduits as the second shaft is turned.

3. A lubricant distributing apparatus for a machine having conduits extending to a plurality of operating parts of the machine and a lubricant reservoir, a shaft exposed to the lubricant in the reservoir and formed with spaced transverse holes to provide metering pockets in which measured quantities of lubricant are separated from the reservoir, plungers slidingly mounted in the holes, in combination with means including a second shaft arranged to reciprocate the plungers in the holes as the shafts are turned, pins projecting from the second shaft, and means for rotating the two shafts in opposite directions, the plungers being moved every half rotation of the plunger carrying shaft by the pins in the pin carrying shaft.

4. A lubricant distributing apparatus for a machine having conduits extending to a plurality of operating parts of the machine, a lubricant reservoir, a measuring shaft exposed to the lubricant in the reservoir and formed with spaced transverse holes providing pockets at opposite sides of the shaft, in combination with means for expelling lubricant from the pockets including a second shaft mounted for rotation in parallel relation with the measuring shaft, gears between the two shafts for driving them in opposite directions simultaneously, and pins projecting from opposite sides of the second shaft arranged to dip into the pockets of the measuring shaft as the shafts rotate.

5. A lubricant distributing apparatus for a machine having conduits extending to a plurality of operating parts of the machine, a lubricant reservoir, a measuring shaft exposed to the lubricant in the reservoir and formed with spaced transverse holes providing pockets at opposite sides of the shaft, in combination with means for expelling lubricant from the pockets including a second shaft mounted for rotation in parallel relation with the measuring shaft, gears between the two shafts for driving them in opposite directions simultaneously, pins projecting from opposite sides of the second shaft arranged to dip into the pockets of the measuring shaft as the shafts rotate and plungers in the holes of the measuring shaft against the opposite ends of which the pins act laternately to reciprocate the plungers in the holes.

PERCY WHITE.

(References on following page)

REFERENCES CITED

The following references are of record in the file of this patent:

UNITED STATES PATENTS

| Number | Name | Date |
|---|---|---|
| 584,688 | Jones | June 15, 1897 |
| 856,180 | Radcliffe | June 4, 1907 |
| 1,092,329 | Berry | Apr. 7, 1914 |
| 1,522,673 | Coles | Jan. 13, 1925 |
| 1,649,026 | Gordon | Nov. 15, 1927 |
| 1,846,267 | McCuen | Feb. 23, 1932 |
| 1,961,514 | Ernst | June 5, 1934 |
| 2,274,473 | Davis | Feb. 24, 1942 |

FOREIGN PATENTS

| Number | Country | Date |
|---|---|---|
| 4,036 | Sweden | June 21, 1892 |
| 3,034 | Great Britain | Feb. 10, 1899 |
| 165,923 | Germany | Dec. 8, 1905 |